United States Patent

Erdman et al.

[11] Patent Number: 6,027,252
[45] Date of Patent: Feb. 22, 2000

[54] SIMPLIFIED FIBER OPTIC RECEPTACLE

[75] Inventors: David D. Erdman; John Skitka, both of Hummelstown; Michael Douglas Rossana, Middletown, all of Pa.

[73] Assignee: The Whitaker Corporation, Wilmington, Del.

[21] Appl. No.: 08/994,864

[22] Filed: Dec. 19, 1997

[51] Int. Cl.[7] .................................................. G02B 6/36
[52] U.S. Cl. .............................. 385/76; 385/53; 385/55; 385/77
[58] Field of Search ................................. 385/76, 55, 56, 385/53, 60, 70, 72, 77, 78

[56] References Cited

U.S. PATENT DOCUMENTS

| | | | |
|---|---|---|---|
| 5,073,042 | 12/1991 | Mulholland et al. | 385/69 |
| 5,123,071 | 6/1992 | Mulholland et al. | 385/53 |
| 5,142,597 | 8/1992 | Mulholland et al. | 385/56 |
| 5,774,612 | 6/1998 | Belenkiy et al. | 385/56 X |

*Primary Examiner*—Phan T. H. Palmer

[57] ABSTRACT

A fiber optic adapter has a single piece housing 1 with a retention shoulder 8. A coupling element 2 is received by the housing 1 and abuts the retention shoulder 8 to prevent extraction of the coupling element 2 from the housing 1. The coupling element 2 is retained therein by a retaining element 10 for a secure assembly.

16 Claims, 5 Drawing Sheets

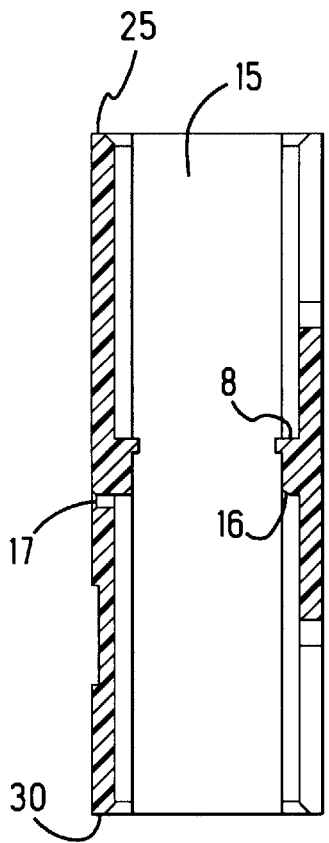
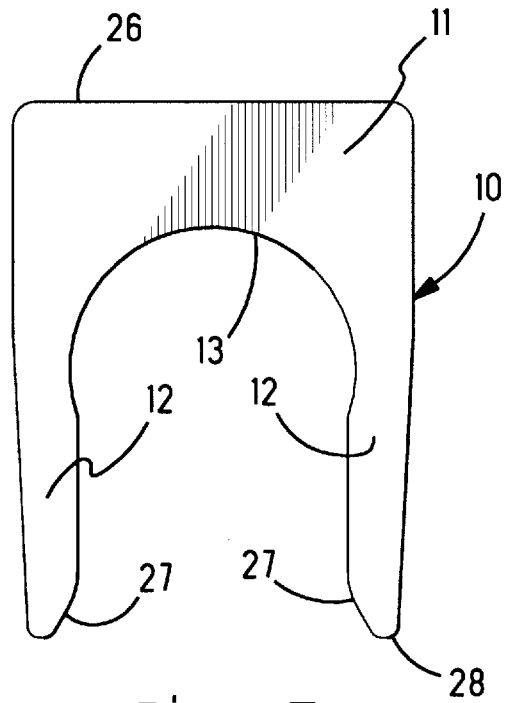
Fig. 5
Fig. 3
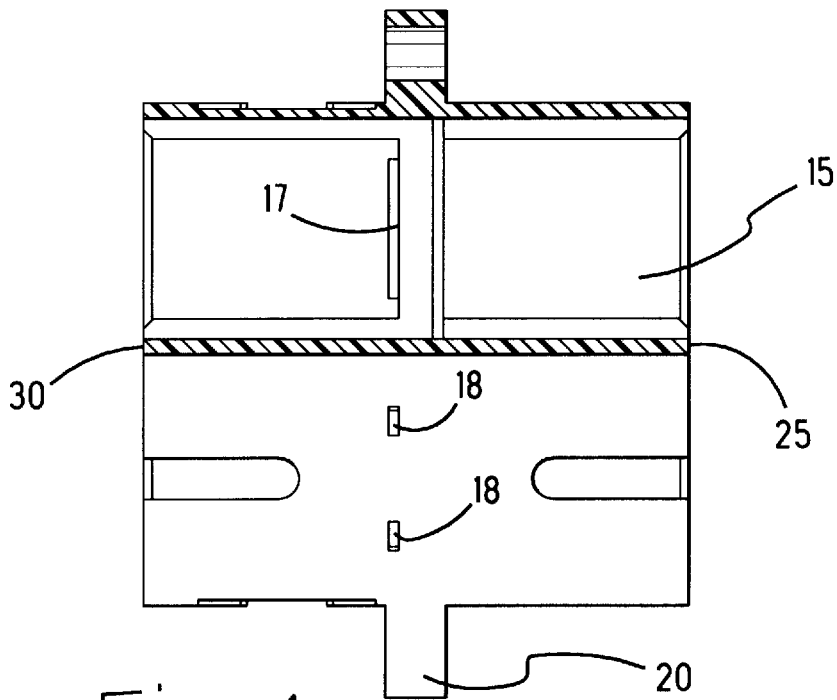
Fig. 4

SIMPLIFIED FIBER OPTIC RECEPTACLE

FIELD OF THE INVENTION

The present invention relates to fiber optic receptacles and adapters.

BACKGROUND OF THE INVENTION

Fiber optic receptacles and adapter are used in communication system installations to position a fiber optic connector relative to an active optical device or to hold two fiber optic connectors in abutting juxtaposition. As fiber optic technology and infrastructure progress, the cost of a fiber optic based installation approaches that of a comparably functional copper wire based installation. One of the cost drivers of a fiber optic installation is the manufacturing cost of the fiber optic components used in such a system including: fiber optic connectors, cable, transceivers, receptacles and adapters. As the available bandwidth of a fiber implemented communications network is higher than a copper network, the use of fiber is highly desirable provided that the cost of the installation and service is within reasonable financial justification. Accordingly, there is a need to minimize the manufacturing cost of each fiber optic component.

In a typical building having a fiber optic network installation, there is a room or wiring closet in which a number of interconnections are made between the trunk fiber and the distribution fibers that go to various points in the building. In the wiring closet, there are bays loaded with patch panels with an array of fiber optic receptacles or adapters. For purposes of the present description, a receptacle is defined as a fitting that is designed to accept a mating plug. An adapter is an example of a device having two receptacles on opposite ends and along the same mating axis to provide for mating of two plugs received on either side of the receptacle. Adapters may be used to mate two of the same style plug or two different style plugs. The term, receptacle, therefore, is intended to refer to the general case which includes the more limited category of devices called adapters. The larger the installation, the greater the number of receptacles used and the greater the amount of physical space that must be dedicated to the wiring closet. This physical space adds to the building maintenance overhead real estate which adds to the cost of operating the building. The denser the receptacles, the greater the number of interconnections may be made in the same amount of physical space, and the lower the overhead. There is a need, therefore, for a fiber optic receptacle having a lower profile than is currently available while accommodating the currently known types of fiber optic connector styles.

Fiber optic receptacles that are currently available may be molded or die cast and comprise two housing halves, each half having a flange around an outer profile of the housing half. An example of an SC-FC fiber optic adapter is disclosed in U.S. Pat. No. 5,073,042. In the case of an SC to SC, ST style, or FC style adapter, the housing receives an alignment sleeve and one or more coupling elements to mate with an SC style connector (ST is a registered trademenk of Lucent Inc. The flanges of the two halves are joined together to captivate the coupling element(s) and alignment sleeve within the housing. The flange on the outer profile has through holes that receive a screw in order to provide a means of attachment of the housing to a patch panel or other mounting surface. The flange also comprises a riveting hole or complementary nubs and recesses for joining of the flanges by either orbital riveting or ultrasonic welding. Both orbital riveting and ultrasonic welding require expensive capital equipment run by skilled operators which adds to the manufacturing cost of the adapter. Additionally, space on the flange that is required to accommodate the rivets or the ultrasonic concentrators adds to the profile of the adapter. There is a need, therefore, to reduce the manufacturing cost and profile of a fiber optic receptacle and adapter.

SUMMARY OF EMBODIMENTS OF THE INVENTION

It is an object of an embodiment according to the teachings of the present invention that a receptacle may be manufactured at a lower cost.

It is an object of an embodiment according to the teachings of the present invention that a receptacle housing may be implemented for both a die cast and a molded part.

It is an object of an embodiment according to the teachings of the present invention that a fiber optic receptacle has a minimally sized profile.

A fiber optic receptacle comprises a housing, a coupling element received by the housing, and a retaining element engaging the coupling element. The retaining element interferes with the housing to resist extraction of the coupling element from the housing.

It is an advantage of an embodiment according to the teachings of the present invention that a receptacle may be manufactured at a lower cost in a molded and a die cast configuration.

It is an advantage of an embodiment according to the teachings of the present invention that a fiber optic receptacle has a minimally sized profile.

BRIEF DESCRIPTION OF THE DRAWINGS

These and other advantages and results of embodiments of the invention are apparent from the following detailed description by way of example and from the accompanying drawings in which:

FIG. 3 is a cross sectional view of an SC-SC housing embodiment according to the teachings of the present invention.

FIG. 4 is a plan view of the housing of FIG. 3.

FIG. 5 is a plan view of a retaining fork according to the teachings of the present invention.

DETAILED DESCRIPTION OF THE PREFERRED EMBODIMENTS

Figure 1:
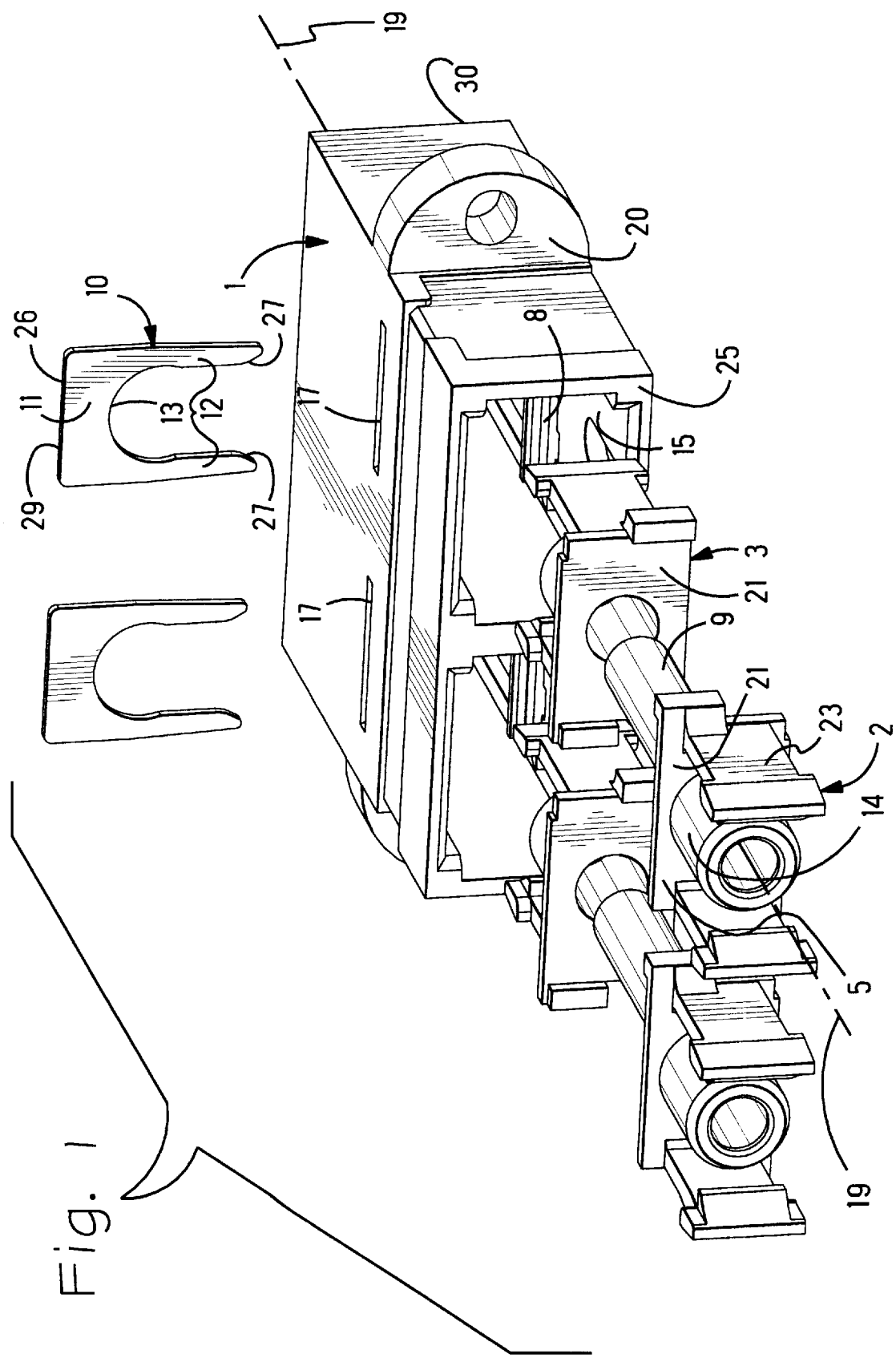
FIG. 1 is an exploded perspective view of an SC-SC embodiment of a adapter according to the teachings of the present invention.
Figure 2:
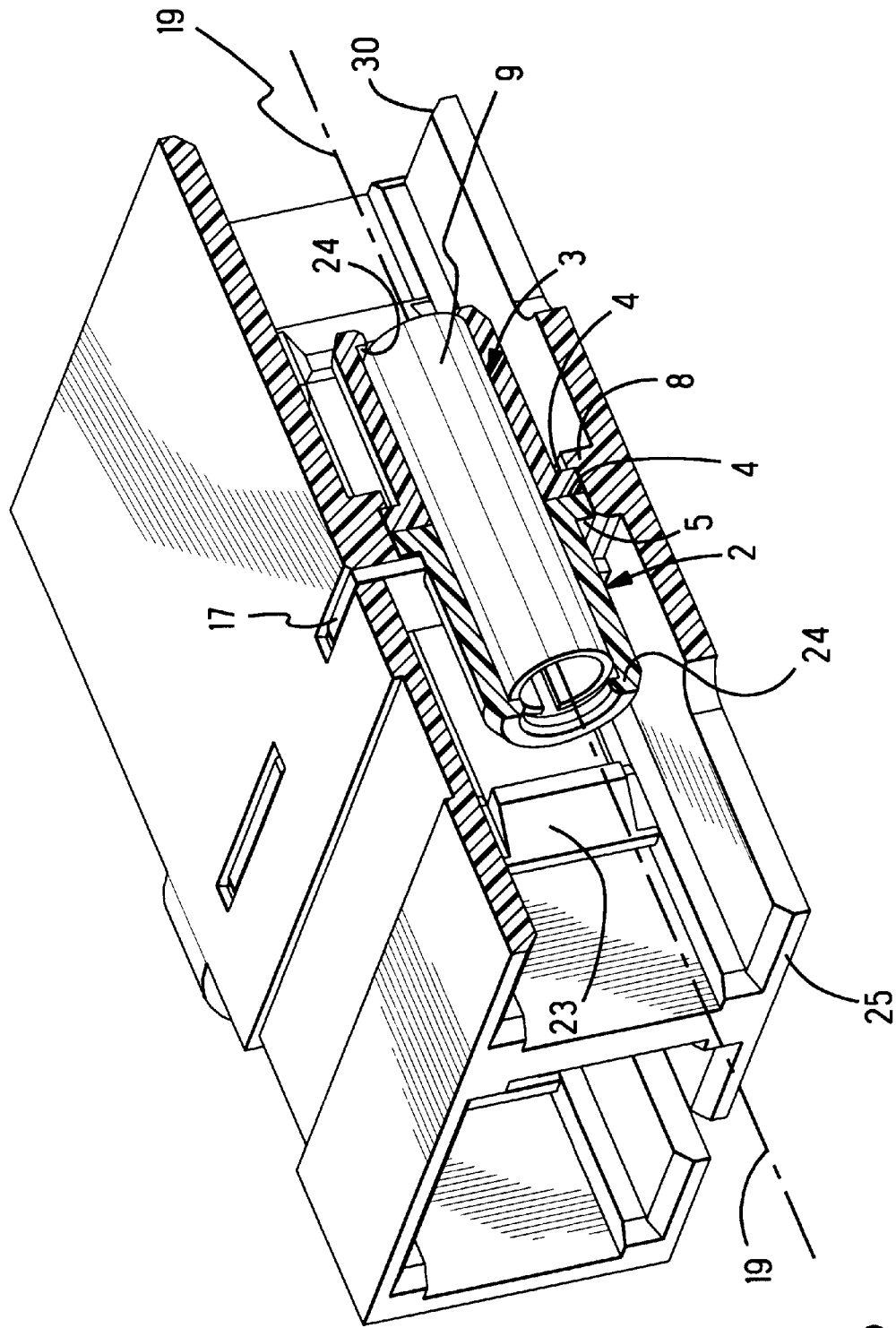
FIG. 2 is an assembled perspective view shown in partial cutaway of the adapter of FIG. 1.

With specific reference to FIGS. 1–4, there is shown an SC-SC style adapter according to the teachings of the present invention in which a housing 1 receives first and second coupling elements 2,3, and slotted alignment sleeve 9. The housing 1 is a single piece having a longitudinal through passage 15 and a mating axis 19. The housing 1 has a substantially rectangular inner geometry permitting access from an assembly end 25 and a nonassembly end 30 of the housing 1 for mating receipt of SC style fiber optic connectors(not shown) along the mating axis 19. Approximately central to the through passage 15, there is an area of decreased inner geometry creating an inner protuberance transverse to the mating axis and comprising a retention shoulder 8 and assembly chamfer 16. Directly above and centered about the assembly chamfer 16, there is an upper slot 17 extending through the housing 1. The upper slot 17 has a long side transverse to the mating axis 19. Directly adjacent the assembly chamfer 16, there are two lower slots 18. The two lower slots 18 are smaller in size relative to the upper slot 17 and are spaced from each other along a line transverse to the mating axis 19 an equal distance from each other. The housing 1 further comprises two flanges 20 on an exterior of the housing 1, each flange 20 on opposite sides of the housing 1. Each flange 20 has a hole to receive a securing bolt or other known device for securing the adapter to a mounting surface.

The first and second coupling elements 2,3 couple to SC style fiber optic connectors and each comprise a generally planar coupling base 21, alignment barrel 14, and opposite cantilever catch arms 23. The alignment barrel 14 and the cantilever catch arms 23 extend perpendicularly to the coupling base 21 to one side thereof. The coupling elements 2,3 may be molded as a single piece. The alignment barrel 14 has a generally tubular geometry with the end of the alignment barrel 14 having a reduced inner diameter to create a lip 24 at an end distal from the coupling base 21. A split alignment sleeve 9 has an outer diameter sized to be received by the inner diameter of the alignment barrel 14 at the coupling base end, but sized to also be resistant to extraction from the alignment barrel 14 by the lip 24 at the end of the alignment barrel 14 distal from the coupling base 21.

The first and second coupling elements 2,3 receive the alignment sleeve 9 in respective ones of the alignment barrels 14. The alignment sleeve 9 is held in place by the respective lips 24 at the end of each alignment barrel 14. The housing 1 has an internal geometry at the assembly end 25 to fully receive the outer profile of the coupling base 21 of each of the first and second coupling elements 2,3. The second coupling element 3 is received by the housing 1 at the assembly end 25 of the housing 1 and slides along the mating axis 19 until a first interference face 4 of the second coupling element 3 engages the retention shoulder 8. The engagement of the first interference face 4 and the retention shoulder 8 prevents further movement of the second coupling element 3 along the mating axis 19 and prevents forward extraction of the first and second coupling elements 2,3 out of the housing 1. The first coupling element 2 is also received by the housing 1, the first coupling element 2 abutting the second coupling element 3 with the second interference face 5 facing the assembly end 25 of the housing 1. The housing 1 receives the retaining element 10 into upper slot 17. The retaining element 10 comprises a retaining fork having a base 11 joining two tines 12. The retaining element 10 is stamped out of a flat metal sheet such as stainless steel. The base 11 is relatively thin, but substantially flat on a bearing side 26 and has a partial annular rim 13 opposite the bearing side 26. The partial annular rim 13 is more than semicircular creating an undercut at the juncture of the base 11 and the tines 12. The housing 1 receives the retaining element 10 in the upper slot 17 permitting the tines 12 to enter into the through passage 15 of the housing 1 and on an assembly end 25 side of the first coupling element 2. The distance of the tines 12 from each other is such that each tine 12 engages an outer diameter of the alignment barrel 14 of the first coupling element 2 as the retaining element 10 continues ingress into the through passage 15 through the upper slot 17. The ends of the tines 12 distal from the base 11 have an interior lead-in 27. As the tines 12 move over the alignment barrel 14, the interior lead-in 27 on each tine 12 cams them and the tines 12 flex outwardly and around the alignment barrel 14. An exterior lead-in 28 on each tine 12 opposite the interior lead-in 27 aids smooth travel of the tines 12 through the housing 1 if the tines 12 should contact the interior wall of the housing 1 during their outward flexure. When the retaining element 10 is fully received within the housing 1, the bearing side 26 of the retaining element 10 is flush with the exterior of the housing 1 and the alignment barrel 14 is seated within the partial annular rim 13 of the base 11 on the interior of the housing 1. The partial annular rim 13 in the base 11 is sized to receive the exterior of the alignment barrel 14 permitting the tines 12 to return to an unflexed position. Due to the partial annular rim 13 being more than semicircular, an undercut is formed at the juncture of the base 11 and the tines 12 of the retaining element 10. When the tines 12 retract to the unflexed position, the undercut is positioned on the alignment barrel 14 along a nondiametric chord of the cross section of the alignment barrel 14. The position of the undercut relative to the alignment barrel 14, therefore, resists retraction of the retaining element 10 from the upper slot 17. An end of each tine 12 distal from the base 11, is received by a respective one of the lower slots 18. Proper insertion of the tines 12 into the lower slots 18 is aided by the assembly chamfer 16. The assembly chamfer 16 is an area of gradual reduction of the inner profile of the housing 1. The lower slots 18 are positioned adjacent the assembly chamfer 16. During insertion of the retaining element 10, as the tines 12 move over the alignment barrel 14, the ends of the tines 12 distal from the base 11 engage the assembly chamfer 16. The gradual and smooth incline of the assembly chamfer 16 cams the tines 12 along the chamfer 16, and causes the tines 12 to flex in a direction parallel to the mating axis 19. The ends of the tines 12 move along the assembly chamfer 16 to guide the end of each tine 12 into alignment with the respective one of the lower slots 18. When the retaining element 10 is fully received in the housing 1, the tines 12 are received by the lower slots 18, but do not extend past the outer perimeter of the housing 1.

When the retaining element 10 is fully received in the housing 1, a retaining element interference face 29 is positioned against second interference face 5 of the first coupling element 2. The tines 12 of the retaining element 10 are positioned on an exterior of the alignment barrel 16 and on an alignment barrel side of the catch arms 23. The base 11 of the retaining element 10 which is positioned in the upper slot 17 and the ends of the tines 12 which are positioned in the lower slots 18 interfere with the housing 1 to prevent extraction of the retaining element 10 through the assembly end 25 of the through passage of the housing 1. The engagement of the retaining element interference face 29 and the second interference face 5, therefore, prevents extraction of the first and second coupling elements 2,3 from the housing 1. The retention shoulder 8 prevents extraction of the second and first coupling elements 2,3 through the nonassembly end 30 of the housing 1. Retention of the first and second coupling elements 2,3 also retains the alignment sleeve 9 through captivation of the sleeve 9 between respective lips 24 of the respective alignment barrels 14 of the first and second coupling elements 2,3. The feature of the more than semicircular partial annular rim 13 of the retaining element 10 resists extraction of the retaining element 10 from the upper slot 17 once it is fully received by the housing 1 and positioned over the alignment barrel 14. Accordingly, the retaining element 10 securely maintains the assembly of the first and second coupling elements 2,3 and alignment sleeve 9 within the housing 1, and the alignment barrel 14 of the coupling element 2 resists extraction of the retaining element 10.

Figure 6:
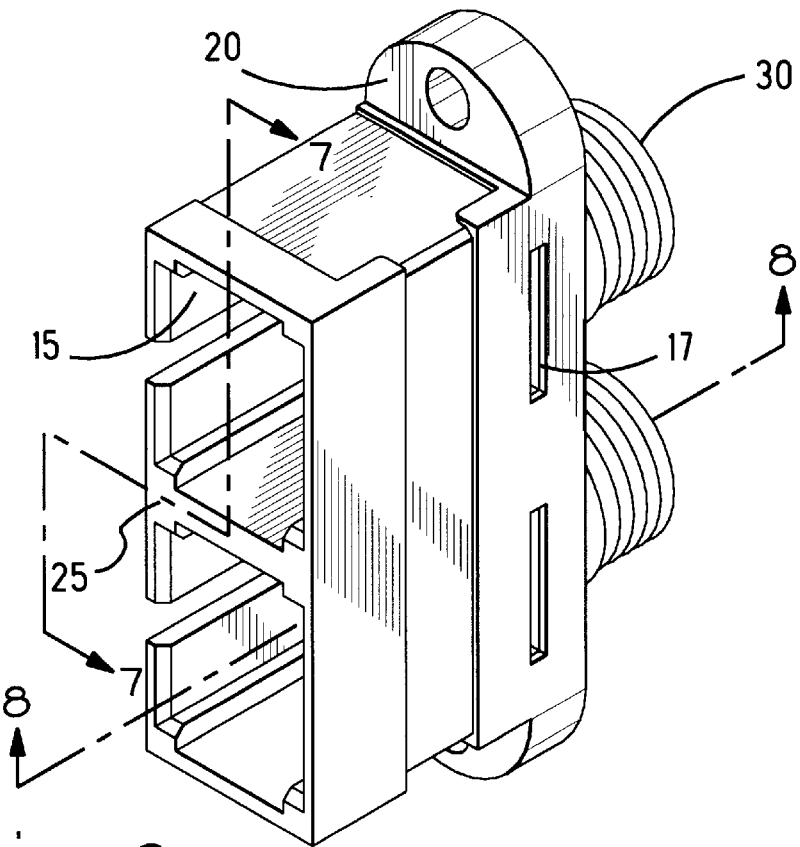
FIG. 6 is a perspective view of an SC-FC embodiment of a adapter according to the teachings of the present invention.
Figure 7:
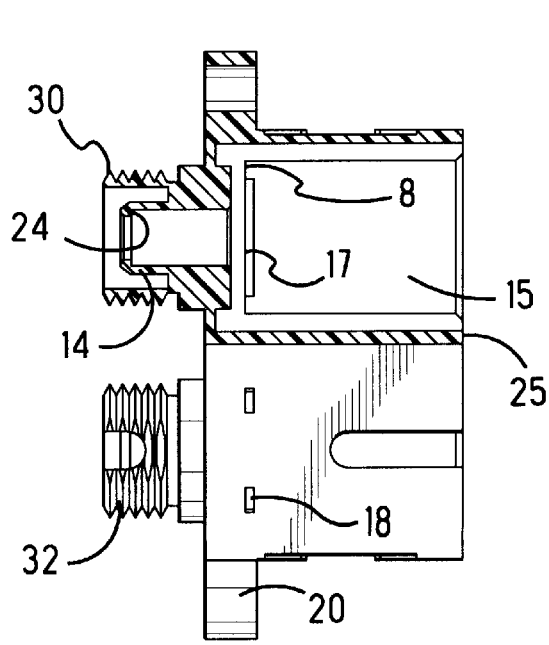
FIG. 7 is a cross sectional view of the housing of FIG. 6 taken along lines 7—7.
Figure 8:
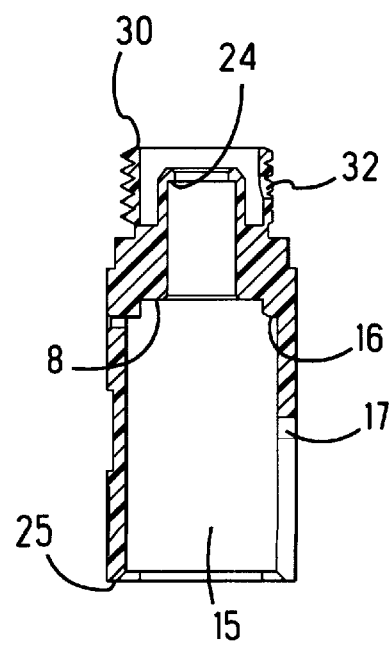
FIG. 8 is a cross sectional view of the housing of FIG. 6 taken along lines 8—8.
Figure 9:
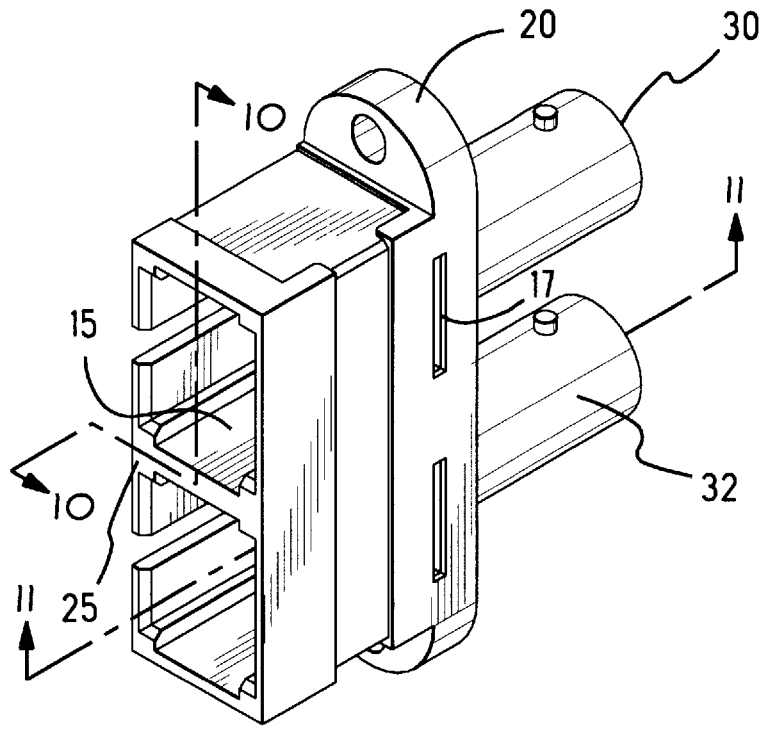
FIG. 9 is a perspective view of an SC-ST style embodiment of a adapter according to the teachings of the present invention.
Figure 10:
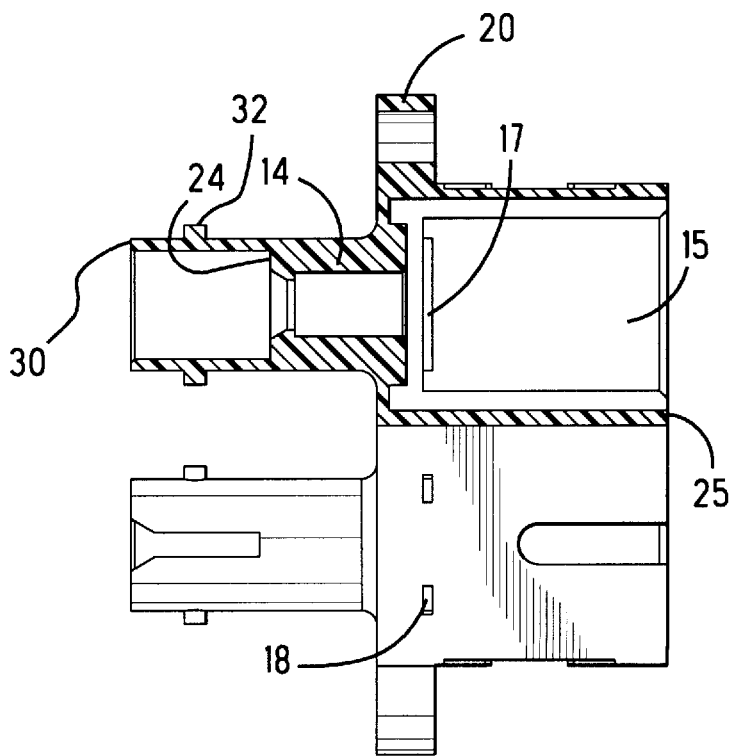
FIG. 10 is a cross sectional view of the housing of FIG. 9 taken along lines 10—10.
Figure 11:
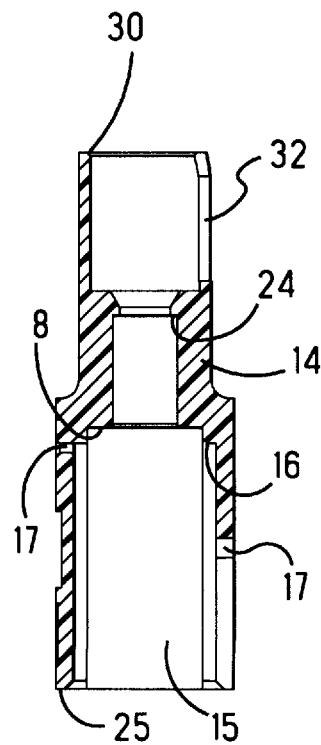
FIG. 11 is a cross sectional view of the housing of FIG. 9 taken along lines 11—11.

Alternate embodiments of an adapter according to the teachings of the present invention comprise an SC-FC and an SC-ST style configuration. With specific reference to FIGS. 6-8 of the drawings, there is shown an SC-FC embodiment in which the housing 1 comprises a single piece having an SC style mating interface on an assembly end 25 and an FC style mating interface on a nonassembly end 30 of the housing 1. With specific reference to FIGS. 9–11 of the drawings, there is shown an SC-ST style adapter embodiment in which the housing 1 comprises a single molded or die cast piece having an SC style mating interface on an assembly end 30 and an ST style mating interface on a nonassembly end 31 of the housing 1. In the SC-FC and SC-ST style embodiments, the FC and ST style coupling elements are unitary with the housing. The FC style comprises a threaded mating interface 32 and the ST style comprises a bayonet mating interface 32, but the adapter according to the teachings of the present invention is otherwise similar for these two embodiments. Both the FC and ST mating interfaces further comprise the alignment barrel 14 having a lip 24, the alignment barrel being coaxial with the mating interface 32 and also unitary with the housing 1. During assembly, the alignment barrel 14 receives the alignment sleeve 9 which is retained by the lip 24. A single first coupling element 2 having the SC style catch arms 23 is received at the assembly end 25 of the housing 1 until the first interference face 4 abuts the retention shoulder 8. The alignment barrel 14 of the coupling element 2 receives the alignment sleeve 9 against the lip 24. The retaining element 10 is received in the upper slot 17 of the housing 1. The tines 12 of the retaining element 10 engage the assembly chamfer 16 and are received by the lower slots 18 as previously described. Interference of the retaining element 10 and the housing 1 and interference of the retaining element 10 and the first coupling element 2 provide for secure assembly of the adapter according to the teachings of the present invention.

Alternate embodiments according to the teachings of the present invention are apparent from the description and the accompanying drawings which shown by way of example. For example, the teachings of the present invention are readily applicable to a fiber optic receptacle receiving only a single plug. Embodiments described herein are for illustrative purposes only and do not limit the scope of the claimed invention. It is intended that the scope of the invention be limited only by the claims which follow.

We claim:
1. A fiber optic receptacle comprising:
   a unitary housing having an assembly end and a non-assembly end and openings on each end defining a through passage therebetween,
   a coupling element received by the through passage at the assembly end of said housing,
   a corresponding coupling element unitary with said non-assembly end of said housing, and
   a retaining element engaging the coupling element received at the assembly end of said housing and interfering with the housing to secure the assembly end coupling element to the corresponding coupling element at the non-assembly end of said housing.
2. A fiber optic receptacle as recited in claim 1, said retaining element further comprising at least two tines joined by a base.
3. A fiber optic receptacle as recited in claim 2, said assembly end coupling element further comprising an alignment barrel and said base of said retaining element comprising a partial annular rim receiving said alignment barrel.
4. A fiber optic receptacle as recited in claim 3, said partial annular rim comprising more than a semiannular rim receiving said alignment barrel.
5. A fiber optic receptacle as recited in claim 2 and said tines engaging said assembly end coupling element.
6. A fiber optic receptacle as recited in claim 2 and said tines and said base interfering with said housing.
7. A fiber optic receptacle as recited in claim 2 and further comprising an interior lead-in on each of said tines.
8. A fiber optic receptacle as recited in claim 2 and further comprising an exterior lead-in on each of said tines.
9. A fiber optic as recited in claim 1, said assembly end coupling element comprising a first assembly end coupling element, the receptacle further comprising a second assembly end coupling element received by said housing.
10. A fiber optic receptacle as recited in claim 9 the housing further comprising a retention shoulder, said assembly end coupling element further comprising a first interference face engaging said retention shoulder.
11. A fiber optic receptacle as recited in claim 10, said second assembly end coupling element further comprising a second interference face engaging said retaining element.
12. A fiber optic receptacle as recited in claim 1, the housing further comprising a retention shoulder, said assembly end coupling element further comprising a first interference face engaging said retention shoulder.
13. A fiber optic receptacle as recited in claim 12, said assembly end coupling element further comprising a second interference face engaging said retaining element.
14. A fiber optic receptacle as recited in claim 1 and further comprising an alignment sleeve received by said coupling element.
15. The fiber optic receptacle of claim 1, wherein the assembly end coupling element and the corresponding non-assembly end coupling element are the same style of coupling element.
16. The fiber optic receptacle of claim 1, wherein the assembly end coupling element and the corresponding non-assembly end coupling element are different styles of coupling elements.

* * * * *